(12) United States Patent
McCahill et al.

(10) Patent No.: US 7,691,162 B2
(45) Date of Patent: Apr. 6, 2010

(54) SPIKE AIR FILTER APPARATUS AND METHOD

(76) Inventors: Bill McCahill, 12155 Pangborn Ave., Downey, CA (US) 90241; Steve Campbell, 10440 NW. 54th Ave., Grimes, IA (US) 50111; Antonio Miguel Llerandi, P.O. Box 6163, San Diego, CA (US) 92166

( * ) Notice: Subject to any disclaimer, the term of this patent is extended or adjusted under 35 U.S.C. 154(b) by 678 days.

(21) Appl. No.: 11/542,417

(22) Filed: Oct. 3, 2006

(65) Prior Publication Data

US 2008/0078147 A1   Apr. 3, 2008

(51) Int. Cl.
*B01D 46/00* (2006.01)

(52) U.S. Cl. .......................... 55/385.3; 55/406; 55/418; 123/198 E; 180/212; 180/219; 180/220; 180/226; 180/227; 180/229

(58) Field of Classification Search .................. 55/306, 55/394, 396, 401, 406, 521, 385.3, 418; 60/39.092; 123/198 E; 180/212, 219, 220, 226, 227, 180/229
See application file for complete search history.

(56) References Cited

U.S. PATENT DOCUMENTS

| 3,121,545 | A | * | 2/1964 | Meletiou | 244/53 B |
| 3,196,598 | A | * | 7/1965 | Olson | 55/306 |
| 3,871,844 | A | * | 3/1975 | Calvin, Sr. | 55/306 |
| 3,998,048 | A | * | 12/1976 | Derue | 60/39.092 |
| 4,149,689 | A | * | 4/1979 | McDonald | 244/53 B |
| 4,157,902 | A | * | 6/1979 | Tokar | 55/385.3 |
| 6,872,232 | B1 | * | 3/2005 | Pavlatos | 55/306 |
| 7,179,315 | B2 | * | 2/2007 | Huang | 55/337 |
| 2005/0210843 | A1 | * | 9/2005 | Bajza et al. | 55/385.3 |
| 2006/0288673 | A1 | * | 12/2006 | Wimmer | 55/385.3 |

* cited by examiner

*Primary Examiner*—Duane Smith
*Assistant Examiner*—Minh-Chau T Pham

(57) ABSTRACT

An elongate spike configuration of air filter for an automotive vehicle includes a cowl arranged to extend parallel to the ram air flow about the vehicle and resulting from movement of the vehicle at speed. The cowl is rotational and is power driven in rotation during operation of the vehicle such as to smooth ram air flow, reducing turbulence and excessive ram air pressure so as to improve running smoothness of the vehicle engine.

14 Claims, 6 Drawing Sheets

SPIKE AIR FILTER APPARATUS AND METHOD

BACKGROUND OF THE INVENTION

1. Field of the Invention

The present invention relates generally to a ram-air spike filter apparatus and method, and particularly to an air filter which is both decorative and utilitarian. More Particularly, this invention relates to such a spike air filter which has application to a large V-twin type of motorcycle. A decorative aspect of the air filter according to this present invention results from a dynamic or "mobile" aspect of its appearance while the motorcycle engine is running or in operation. That is, the housing or "spike" of the air filter includes a polished, facet-cut cowl portion which is rotational, and which rotates continuously, catching and reflecting available light. Also, the rotating housing portion serves the utility of the motorcycle by opposing and smoothing ram-air flow resulting from movement of the motorcycle, which ram-air flow and attendant turbulence and pressure fluctuations may otherwise cause the motorcycle engine to run too lean or to run roughly were the air-smoothing accomplished by the spike air filter not effective.

2. Related Technology

Motorcycles generally use an air filter to both filter and control the flow of air from ambient into the engine's intake tract. While it is generally believed that a low or zero flow resistance air filter is desirable, in point of fact most motorcycle engines and carburetors require a small but positive resistance for the air filter. The exception to this rule is those engines using a ram air intake tract, in which the carburetor venturi and its venting system are both exposed to ram air pressure. However, having ram air applied to only the carburetor venturi is likely to make the engine run erratically, or to surge and buck instead of running smoothly and powerfully.

SUMMARY OF THE INVENTION

In view of the deficiencies of the conventional related technology, it is an object of this invention to overcome or reduce one or more of these deficiencies.

Accordingly, one particularly preferred embodiment of the present invention provides an elongate spike configuration of air filter for an automotive vehicle, the spike air filter having a cowl portion exposed to ram air resulting from movement of the automotive vehicle, and an air filter element disposed within the cowl, a motor disposed in driving association with the cowl and rotating the cowl during movement of the automotive vehicle.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWING FIGURES

FIG. 1 provides a side elevation view of a motorcycle including a spike air filter according to this invention;

FIG. 2 is an enlarged fragmentary view of a portion of FIG. 1;

FIG. 3 provides an isolated perspective view of a spike air filter as seen in FIGS. 1 and 2;

Figure 6:
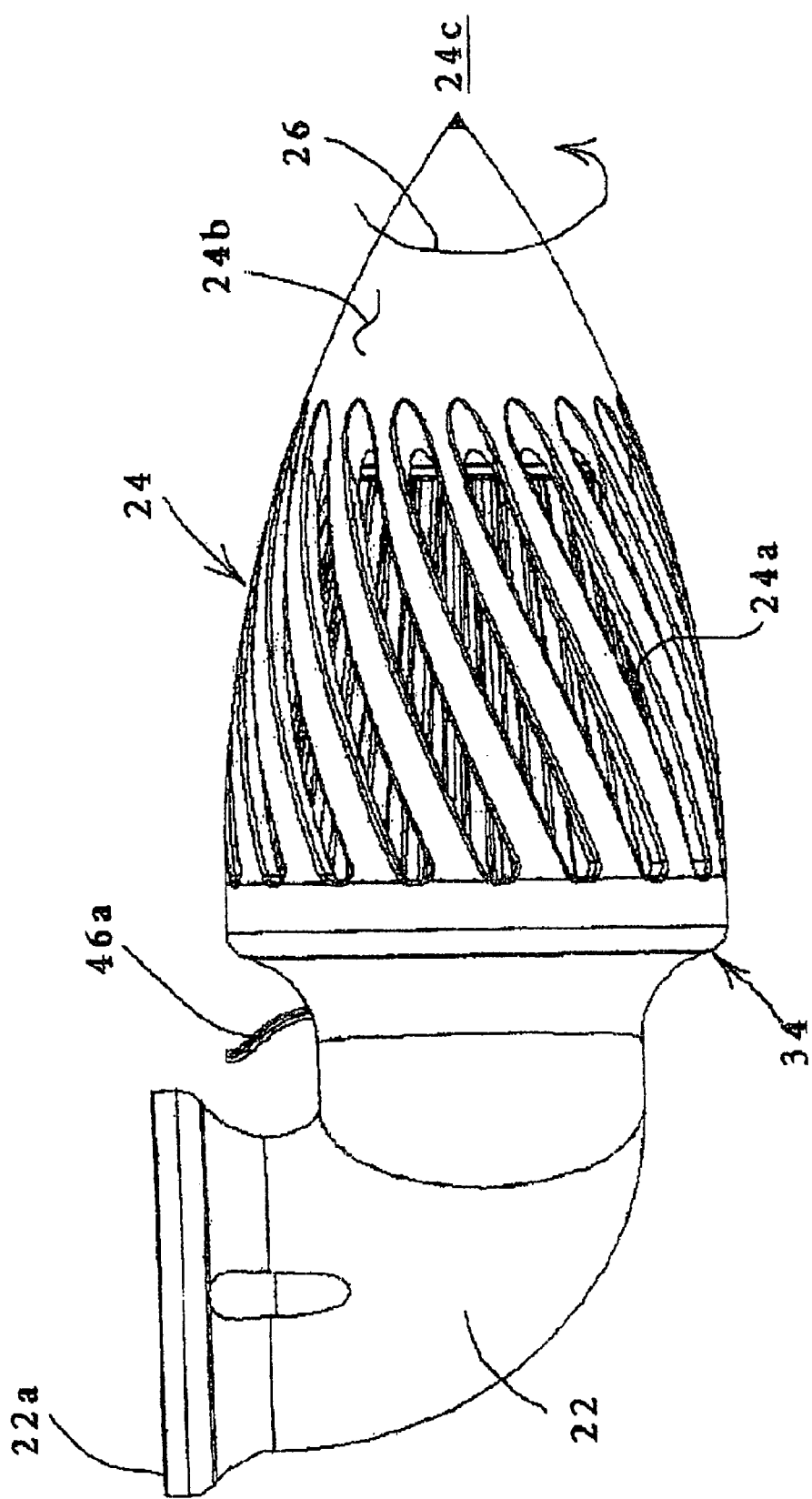

FIG. 6 provides a plan view of an air filter according to this invention; and

Figure 7:
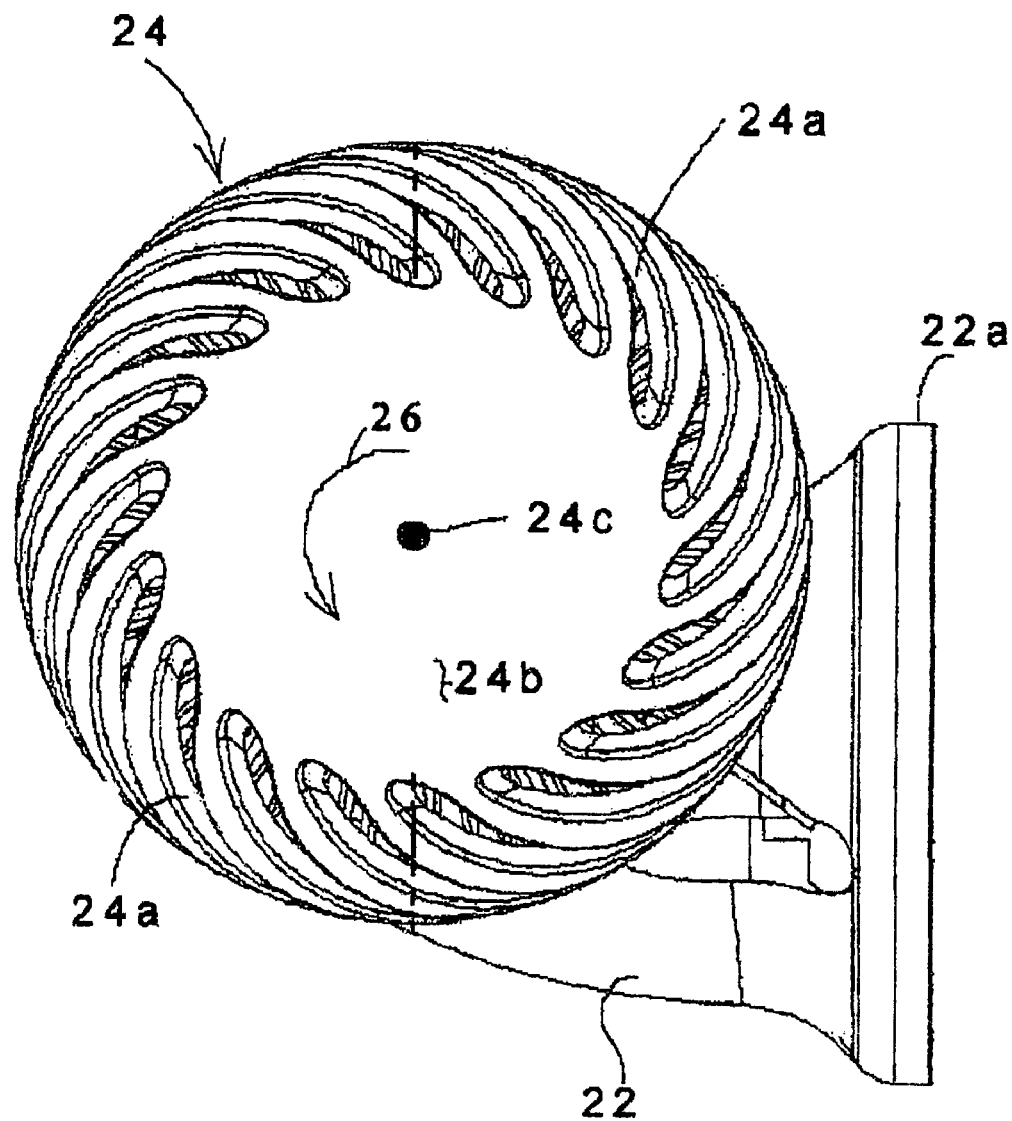

FIG. 7 illustrates a front end view of the air filter.

DETAILED DESCRIPTION OF AN EXEMPLARY PREFERRED EMBODIMENT OF THE INVENTION

While the present invention may be embodied in many different forms, disclosed herein is one specific exemplary embodiment which illustrates and explains the principles of the invention. In conjunction with the description of this embodiment, a method of providing and operating a spike air filter according to this invention will be apparent. It should be emphasized that the present invention is not limited to the specific embodiment illustrated.

Figure 1:
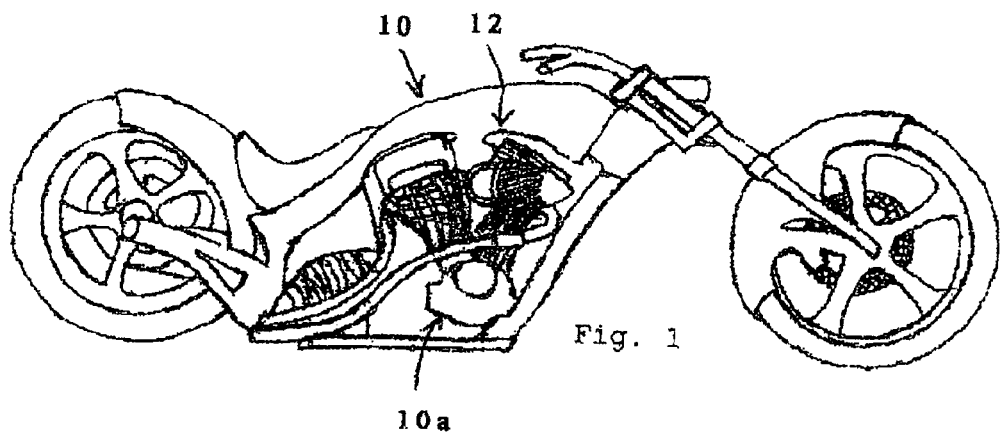
Figure 2:
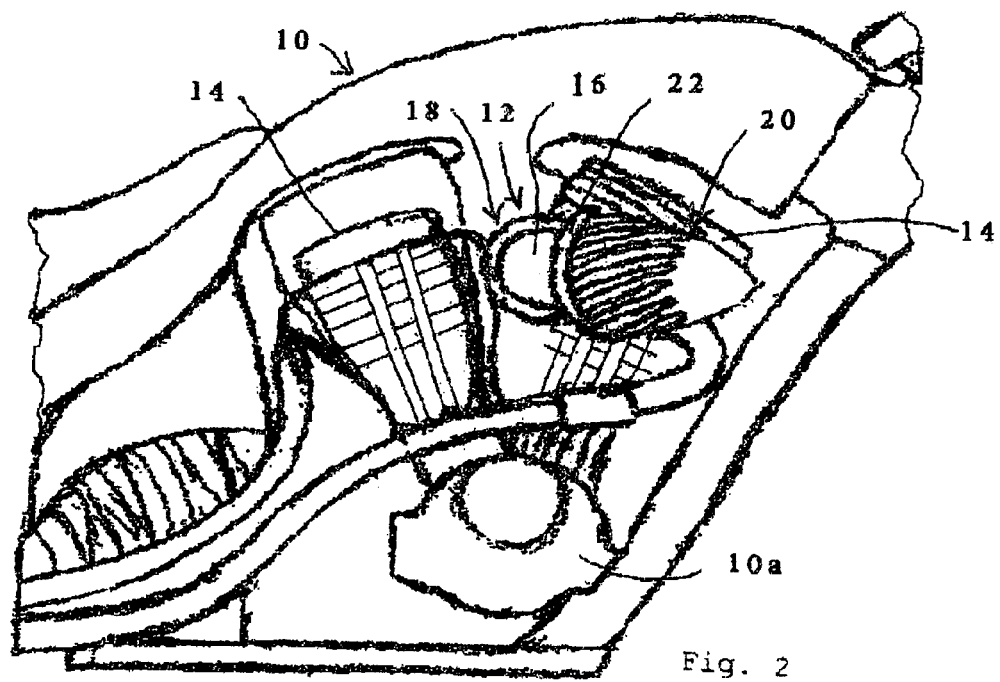
Figure 3:
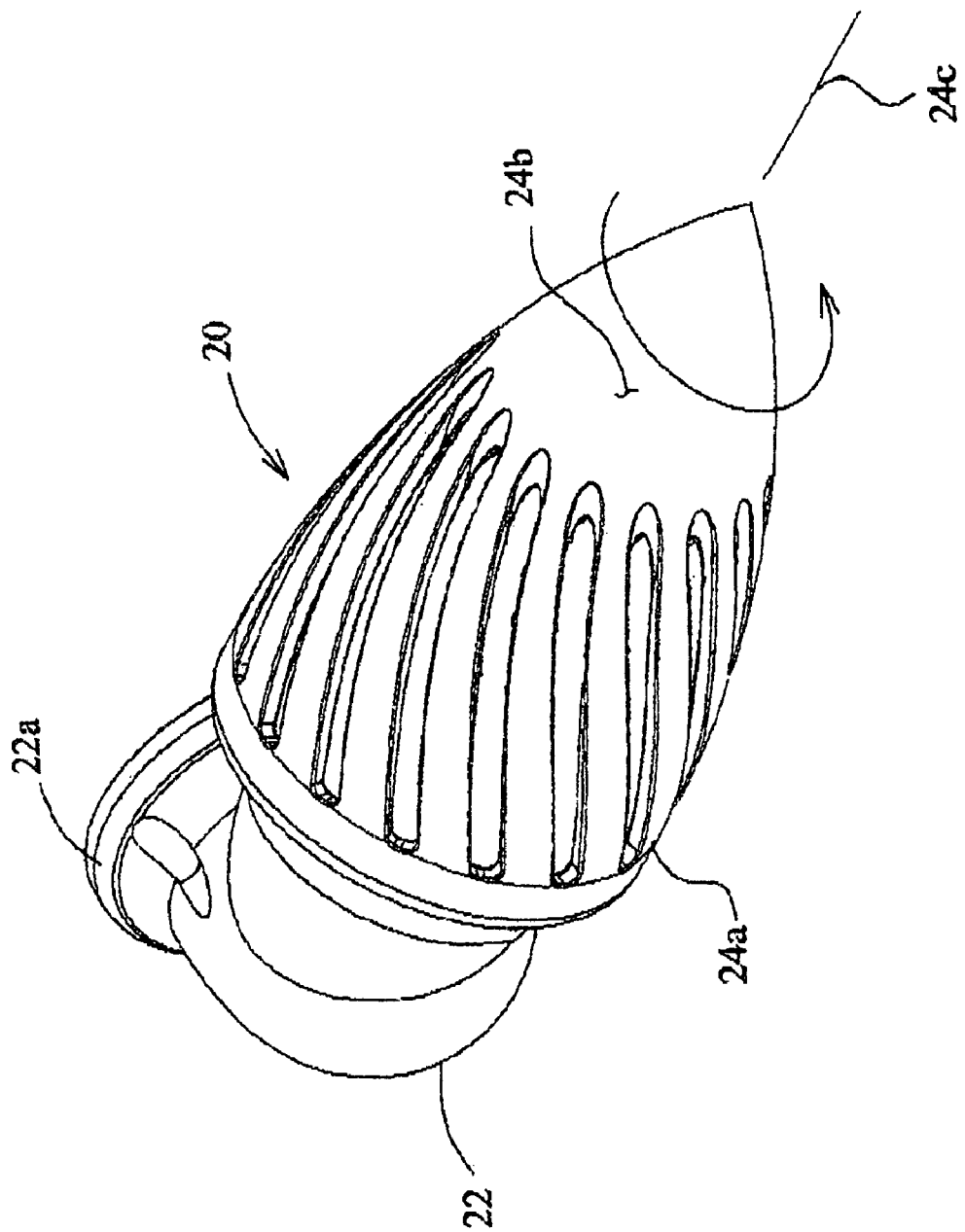

Turning now to FIGS. 1, 2, and 3, considered in conjunction with one another, FIG. 1 shows a motorcycle 10 having a V-twin engine 10*a* which is provided with an induction system, generally indicated with the numeral 12, and including an air filter according to this invention. FIG. 2 shows that the engine 10*a* includes a pair of cylinders 14 in a narrow-angle V-twin configuration, with an intake tract 16 carrying a carburetor 18 disposed between the cylinders 14. FIGS. 2 and 3 illustrate that the carburetor 18 is supplied with filtered ambient air via an air filter assembly 20, best seen in FIG. 3. The air filter assembly 20 includes a manifold portion 22 including a flange 22*a* for attachment to the air intake of the carburetor 18. This manifold portion 22 is generally of elbow, or L-shaped configuration, and internally defines a flow path (to be better illustrated and described below) by which air flows into the tract 12 of the engine 10*a*. The manifold portion 22 carries a cowl part 24 defining a plurality of circumferentially arrayed, helical, and axially extending slots 24*a*. The cowl part 24 defines an outer surface 24*b*, and is rotational about its axial center line 24*c*, as is indicated by rotation arrow 26, best seen in FIG. 3.

Figure 4:
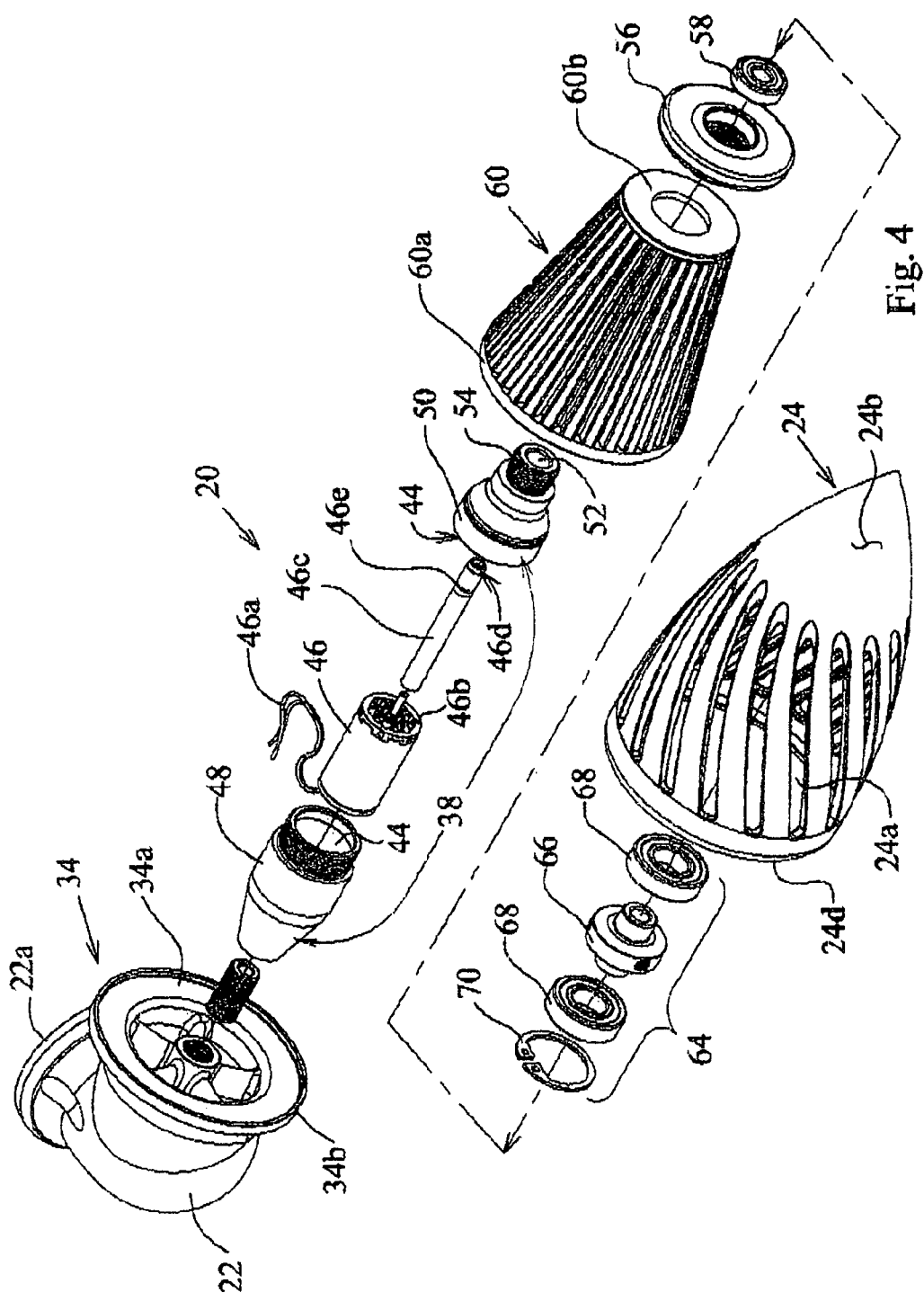
FIG. 4 is an exploded perspective view of the spike air filter seen in the preceding drawing Figures.
Figure 5:
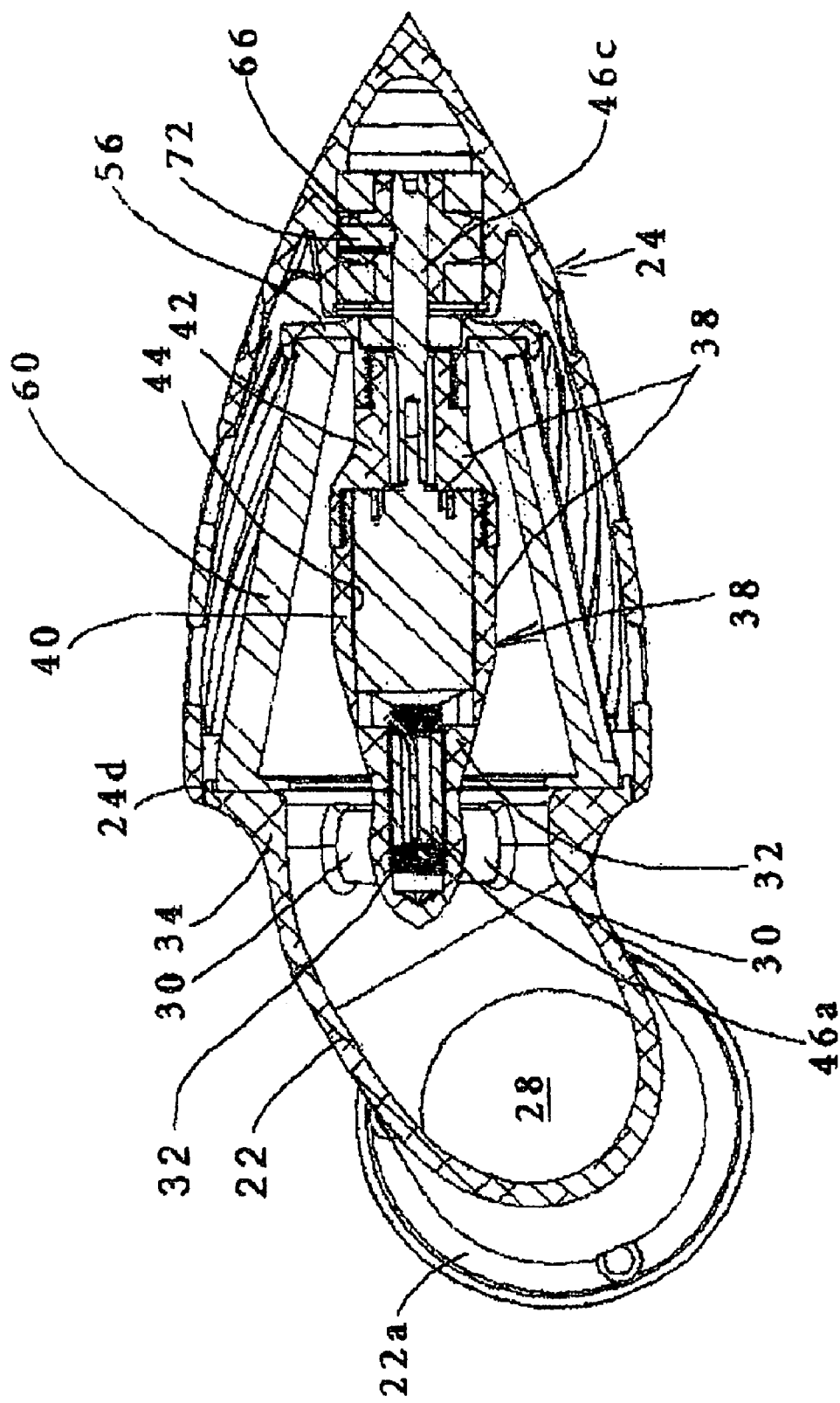
FIG. 5 illustrates a cross sectional elevation view of an air filter according to the present invention.

Turning now to FIGS. 4 and 5 in conjunction with one another, and recalling the description above of FIGS. 1-3, it is seen that the air filter assembly 20 defines a flow path 28 extending therethrough, which is of generally elbow or L-shape, and opening on one end of the manifold part 22 within flange 22*a*. Within the flow path 28, a plurality of radially extending integral struts 30 support a boss 32 adjacent to a flange portion 34. This flange portion 34 presents an axially disposed annular surface 34*a* and a radially outwardly disposed outer surface 34*b*, both surrounding the flow path 28. The boss 32 is internally threaded, and an externally threaded tubular mounting tube or conduit 36 threadably engages the threads of boss 32.

A two-part tubular motor housing structure 38 similarly threads onto the mounting tube 34, to be supported within the flow path 28. This motor housing structure 38 includes a first tubular part 40 and a second tubular part 42, each cooperatively defining an internal cavity 44 for receiving an electric motor 46. The first tubular part 40 defines an externally threaded boss portion 48, while the second tubular part 42 defines an internally threaded collar portion 50, so that the housing parts 38 and 40 are threadably united by engagement of these threaded features so as to capture the motor 46 in cavity 44. The electrical power wire 46*a* from motor 46 passes through tube 36 into the boss 32, and one of the struts 30 is provided with a central radially extending passage 30*a*, which allows the wire to pass outwardly of the manifold portion 22, as is seen best in FIG. 6. The motor 46 is most preferably a gear-head type of motor, and includes an output shaft 46b. To this output shaft 46b is drivingly secured an elongate drive shaft 46c. The tubular motor housing part 42 defines an axial through bore 52 through which passes the elongate drive shaft 46c. Externally, the second housing part 42 also defines an axial boss 54 which is threaded to receive a collar member 56. The collar member 56 also carries a roller bearing 58, which journals the forward portion of shaft 46c.

As is best seen in FIG. 5, a conical air filter element 60 surrounds the motor housing 38, and includes an annular larger diameter end 60a and an annular smaller diameter end 60b. The air filter element is received at its larger diameter annular end 60a against surface 34a and at its smaller diameter annular end is engaged by the collar member 56. The collar member 56 threadably engages on boss 54 of the motor housing 38, allowing a user of the air filter 20 to snuggly retain the air filter element 60 by hand-tightening the collar member 56. As so assembled, the distal end portion 46d of shaft 46c extends forwardly of the bearing 58, as is best seen in FIG. 5.

Carried upon the distal end portion 46d of the shaft 46c, is the cowl member 24. In order to provide for driving of the cowl 24 in rotation, as well as for expedient installation upon and removal of the cowl member 24 to and from the distal shaft portion 46d, the shaft 46c is provided with a circumferential groove 46e. Also, viewing FIGS. 4 and 5 in conjunction will reveal that the cowl member 24 includes a blind stepped axial bore 62. This bore 62 receives a clutch assembly 64, consisting of a rotor 66, and a pair of friction elements, each indicated with the numeral 68, which sandwich the rotor 66. A snap ring 70 retains the clutch assembly 64 in the bore 62. A detent device 72 is carried in the rotor 66 and engages removably into the groove 46e, so that the cowl 24 simply presses onto the distal end 46d of the shaft 46c. The distal end portion 46d is provided with a flat or other driving feature engaging into the rotor 66 for transferring motor torque to the cowl 24 via the interposed friction elements 68.

Thus, the cowl 24 is driven in rotation by the motor 46, but is free to turn ahead of the motor, or to be stopped from rotation should some object interfere with rotation of this cowl 24. It will be noted viewing FIG. 5 that the cowl 24 includes a skirt portion 24a which slightly axially overlaps or overlies the surface 34b of flange 34, so that the radial surface 34b acts as a guide bearing surface to insure that the cowl 24 rotates without substantial wobble or misalignment.

Having considered the structure of the air filter 20, attention may now be directed to its operation. As will be appreciated viewing the drawing Figures, when the engine 10a of motorcycle 10 is running and the motorcycle is moving, the length of the spike air filter 20 is generally aligned with the air stream flowing past the motorcycle due to its movement. That is, the front point or nose at center line 24c of the air filter 20 points in the direction of travel, and the ram air flow from vehicle travel flows about the cowl 24. In these conditions, the ram air flow could cause the engine 10a to run erratically. However, attention to FIG. 7 will show that the helical direction of the slots 24a would cause the ram air flow to spin the cowl 24 in a clockwise direction, were this cowl free to spin in that direction. However, as the drawing Figures illustrate, the motor 46 drives the cowl 24 in counter-clockwise rotation, as is indicated by the arcuate arrows on FIGS. 6 and 7, via the friction elements 68. Most preferably, these friction elements are simply grease filled sealed ball bearing elements, with the grease filling serving to transmit torque from shaft 46c via the hub 66 and the bearings 68 to the cowl 24. In this way, the torque transmission between motor 46 and cowl 24 is sufficient to allow and permit the cowl to be rotated by motor 46. On the other hand, the cowl 24 will stop spinning if it encounters any significant resistance. For example, if the rider of the motorcycle 10 places a hand on the cowl 24, or if the rider's leg touches the cowl 24, then the cowl will stop rotating. Further, the applicants believe that the selected counter-rotation of the cowl 24 assists in smoothing the ram air flow received by the engine 10a via the air filter element 60, such that turbulence and excessive air pressure is prevented from adversely affecting the running smoothness of the engine 10a.

Those skilled in the pertinent arts will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

We claim:

1. An elongate spike air filter for an automotive vehicle, said spike air filter having an elongate cowl portion exposed to and about which flows ram air resulting from movement of the automotive vehicle, and an air filter element disposed within said cowl, an electric motor disposed in driving association with said cowl and rotating said cowl during movement of said automotive vehicle.

2. The spike configuration of air filter according to claim 1 wherein said electric motor is disposed within said cowl and within said air filter element.

3. The spike configuration of air filter according to claim 2 wherein said air filter includes a motor housing disposed within said air filter, and said motor housing receiving said electric motor.

4. The spike configuration of air filter according to claim 3 wherein said electric motor includes a gear-head including an output shaft turning at a reduced speed relative to an armature of said motor.

5. The spike configuration of air filter according to claim 4 wherein the motor housing is elongate and extends from a manifold portion of said air filter forwardly within said air filter element, and a forward portion of said motor housing carries a collar element capturing said air filter element between said manifold portion and said collar element.

6. The spike configuration of air filter according to claim 5 wherein said manifold portion includes a centrally disposed boss carried within an air flow path by a plurality of struts, and at least one of said struts defining a passage opening outwardly on said manifold portion and through which passes an electrical wire supplying electrical power to said electric motor.

7. The spike configuration of air filter according to claim 5 wherein said output shaft drives an elongate shaft member extending forwardly through said collar element, and carrying a clutch engaging said cowl.

8. The spike configuration of air filter according to claim 7 wherein said clutch is a friction-limiting clutch, limiting torque applied to said cowl and allowing relative rotation between said cowl and said elongate shaft member when said torque limit is exceeded.

9. The spike configuration of air filter according to claim 1 wherein said cowl member includes plural elongate helical slots, and said slots are oriented to extend helically in the direction of cowl rotation from front to rear along said cowl member.

10. The spike configuration of air filter according to claim 8 wherein said cowl member defines a blind bore in the forward portion thereof and opening rearwardly, said clutch being received into said blind bore and drivingly engaging said cowl member.

11. The spike configuration of air filter according to claim 10 wherein said clutch includes further a detent device allowing said clutch to be removed from said elongate drive shaft by application of forward manual force applied to said cowl.

12. The spike configuration of air filter according to claim 1 wherein said air filter element is both annular and conical, having an annular larger diameter end and an annular smaller diameter end.

13. An air filter for use on a V-twin motorcycle engine, wherein said air filter mounts alongside of said engine and in the ram air resulting from movement of a motorcycle powered by the engine, said air filter having a cowl portion exposed to and about which the ram air flows, and an air filter element disposed within said cowl, an electric motor disposed in driving association with said cowl and rotating said cowl during movement of the motorcycle, said motor being disposed within said cowl and within said air filter element.

14. A method of utilizing an elongate spike configuration of air filter on a V-twin motorcycle engine, said method including steps of:
   mounting said air filter alongside of said engine and in the ram air resulting from movement of a motorcycle powered by the engine;
   providing said air filter with an exterior cowl portion exposed to and about which the ram air flows;
   disposing an air filter element within said cowl;
   utilizing an electric motor in driving association with said cowl to rotate said cowl during movement of the motorcycle;
   providing said cowl with plural elongate helical slots extending in the direction of rotation from front to rear of said cowl member; and
   by rotation of said cowl member opposing ram air forces resulting from forward movement of the motorcycle such as to smooth air flow and reduce turbulence flowing via said air filter element to the motorcycle engine.

* * * * *